United States Patent
Rossbach

(10) Patent No.: US 9,500,855 B2
(45) Date of Patent: Nov. 22, 2016

(54) MODAL CORRECTOR MIRROR WITH COMPLIANT ACTUATION FOR OPTICAL ABERRATIONS

(75) Inventor: Dennis Rossbach, Corrales, NM (US)

(73) Assignee: The Boeing Company, Chicago, IL (US)

( * ) Notice: Subject to any disclaimer, the term of this patent is extended or adjusted under 35 U.S.C. 154(b) by 618 days.

(21) Appl. No.: 13/487,611

(22) Filed: Jun. 4, 2012

(65) Prior Publication Data

US 2013/0322471 A1 Dec. 5, 2013

(51) Int. Cl.
| | |
|---|---|
| *H01S 3/08* | (2006.01) |
| *G02B 26/08* | (2006.01) |
| *H01S 3/07* | (2006.01) |
| *H01S 3/081* | (2006.01) |
| *H01S 3/139* | (2006.01) |
| *H01S 3/086* | (2006.01) |
| *H01S 3/105* | (2006.01) |
| *H01S 3/13* | (2006.01) |

(52) U.S. Cl.
CPC ............ *G02B 26/0825* (2013.01); *H01S 3/07* (2013.01); *H01S 3/0813* (2013.01); *H01S 3/139* (2013.01); *H01S 3/086* (2013.01); *H01S 3/08059* (2013.01); *H01S 3/105* (2013.01); *H01S 3/1307* (2013.01)

(58) Field of Classification Search
CPC ................. H01S 3/08059; H01S 3/081; H01S 3/105; H01S 3/1053; H01S 3/139
USPC ................................... 372/99; 359/846, 849
See application file for complete search history.

(56) References Cited

U.S. PATENT DOCUMENTS

| | | | |
|---|---|---|---|
| 4,940,318 A | 7/1990 | Ealey et al. | |
| 5,659,563 A * | 8/1997 | Reed ................... | G02B 6/4296 |
| | | | 359/633 |
| 6,198,564 B1 * | 3/2001 | Knight .................. | F41G 7/2213 |
| | | | 244/3.16 |
| 6,840,638 B2 | 1/2005 | Watson | |
| 7,333,215 B2 | 2/2008 | Smith | |
| (Continued) | | | |

FOREIGN PATENT DOCUMENTS

| | | |
|---|---|---|
| EP | 1 376 191 A1 | 1/2004 |
| EP | 1 378 782 A2 | 1/2004 |

OTHER PUBLICATIONS

Tricard et al., Continuous phase plate polishing using magnetorheological finishing, Proc. of SPIE vol. 7062, 2008, 8 pages.

(Continued)

*Primary Examiner* — Tod T Van Roy
(74) *Attorney, Agent, or Firm* — Womble Carlyle Sandridge & Rice LLP

(57) ABSTRACT

A laser resonator is provided that includes a cavity bounded by an end mirror and output coupler, and one or more gain media between the end mirror and output coupler. The laser resonator also includes a modal corrector mirror between the end mirror and output coupler. The modal corrector mirror includes a controllable-profile faceplate including an optically-treated front surface, and an array of static actuators. Each static actuator includes an adjustable element, and a compliant mechanism located between the adjustable element and faceplate. The adjustable element is configured to exert a selectable, localized push-pull force on the faceplate via the compliant mechanism, and the compliant mechanism is configured to scale the respective force.

8 Claims, 10 Drawing Sheets

(56) References Cited

U.S. PATENT DOCUMENTS

| | | | |
|---|---|---|---|
| 7,649,691 B2 | 1/2010 | Griffin et al. | |
| 7,826,513 B2 | 11/2010 | Bossert et al. | |
| 2002/0172253 A1* | 11/2002 | Vetrovec | 372/95 |
| 2003/0234970 A1* | 12/2003 | Phillips et al. | 359/291 |
| 2004/0263817 A1* | 12/2004 | Tanitsu | G03F 7/70066 355/67 |
| 2008/0137697 A1* | 6/2008 | Maeda | H01S 3/109 372/22 |
| 2011/0019295 A1 | 1/2011 | Rooms et al. | |

OTHER PUBLICATIONS

Dai et al., Restraint of mid-spatial frequency error in magnetorheological finishing (MRF) process by maximum entropy method, Sci China Ser E-Tech Sci, Oct. 2009, vol. 52, No. 10, 3092-3097.

Compliant mechanism, http://en.wikipedia.org/w/index.php?title=Compliant_mechanism&printable=yes, May 31, 2012, 2 pages.

Deformable mirror, http://en.wikipedia.org/w/index.php?title=Deformable_mirrors&printable=yes, May 31, 2012, 4 pages.

Taylor et al., The Fabrication and Testing of Optics for EUV Projection Lithography, Lawrence Livermore National Laboratory, 23rd Annual International Symposium on Microlithography, Feb. 22-27, 1998, 13 pgs., Santa Clara, California.

Ohl et el., Imaging performance of telescope mirrors for far-ultraviolet astronomy, Applied Optics, vol. 39, No. 25, Sep. 1, 2000, pp. 2513-2523.

Freeman et al., "Adaptive Laser Resonator," IEEE Journal of Quantum Electronics, IEEE Service Center, Piscataway, NJ, US, vol. 13, No. 9, Sep. 1, 1977, 2 pages.

International Search Report and Written Opinion mailed Dec. 9, 2013 for PCT/US2013/039396, 21 pages.

International Preliminary Report on Patentability mailed Dec. 9, 2014 for PCT/US2013/093396.

\* cited by examiner

MODAL CORRECTOR MIRROR WITH COMPLIANT ACTUATION FOR OPTICAL ABERRATIONS

TECHNOLOGICAL FIELD

The present disclosure relates generally to laser resonators and, in particular, to correcting aberrations in laser resonators.

BACKGROUND

Adaptive Optics (AO) is a term commonly given to the improvement of the performance of optical systems by reducing the effect of varying wavefront distortions. It is used in astronomical telescopes and laser communication systems to remove the effects of atmospheric turbulence, and in imaging systems to reduce the improve image sharpness. AO systems work by measuring distortions in a path and using a device to compensate for them. The extent to which AO can effectively improve resolution, however, fundamentally depends on its ability to accurately measure, track and correct the distortions.

Current AO systems have limited ability to correct errors that have relatively higher spatial-frequency content. This higher frequency content may contribute to scatter due to the angular spectrum associated with it. Wavefront correctors may alter the phase profile of an incident wavefront by changing the physical length over which the wavefront propagates, or changing the refractive index of the medium through which the wavefront passes. Correctors based on mirror technology may change the phase by altering their surface shape (i.e., change their physical length while keeping the refractive index constant). Some devices, such as those based on liquid crystal technologies, rely on localized changes in refractive index. Very small actuator spacings have been thusfar achieved only by use of refractive modulators and micro-mechanical-systems (MEMS), which typically have "hard" boundaries as a result of their more discrete nature, and typically have increased scatter due to those boundaries.

For laser resonators, this means that the corrected system must typically be of the order of 10s of centimeters in aperture to accommodate higher order correction (referred to aperture) using available AO correctors or use telescopic elements. The expense of current wavefront correctors as well as limited power handling capability for the more modestly priced units has caused most researchers to abandon AO correction for small-bore resonator applications in a manufacturing environment.

Therefore, it may be desirable to have an apparatus and method that takes into account at least some of the issues discussed above, as well as possibly other issues.

BRIEF SUMMARY

Example embodiments of the present disclosure are generally directed to a laser resonator, modal corrector and method for correcting aberrations in a laser resonator. According to one aspect of example embodiments, a laser resonator is provided that includes a cavity bounded by an end mirror and output coupler, and one or more gain media between the end mirror and output coupler. The laser resonator also includes a modal corrector mirror between the end mirror and output coupler. The modal corrector mirror includes a controllable-profile (deformable) faceplate including an optically-treated front surface, and an array of static actuators. Each static actuator includes an adjustable element such as an actuating screw, and a compliant mechanism located between the adjustable element and faceplate. The adjustable element is configured to exert a selectable, localized push-pull force on the faceplate via the compliant mechanism, and the compliant mechanism is configured to scale the respective force.

In one example, the compliant mechanism may have a stiffness less than that of the faceplate. More particularly, for example, the compliant mechanism may have a stiffness selected based on a stiffness of the faceplate.

In one example, the laser resonator may further include one or more fold mirrors between the end mirror and output coupler. The respective fold mirror(s) may be separate from the modal corrector mirror and rotatable to correct lower spatial frequency error within the cavity. In this regard, the modal corrector mirror may be configured to correct residual higher spatial frequency error within the cavity.

In an additional or alternative example, the laser resonator may further include one or more statically-actuated mirrors between the end mirror and output coupler. The statically-actuated mirror(s) may be separate from the modal corrector mirror and configured to correct residual lower frequency error within the cavity.

In other aspects of example embodiments, a modal corrector and method are provided for correcting aberrations in a laser resonator. The features, functions and advantages discussed herein may be achieved independently in various example embodiments or may be combined in yet other example embodiments further details of which may be seen with reference to the following description and drawings.

BRIEF DESCRIPTION OF THE DRAWING(S)

Having thus described example embodiments of the disclosure in general terms, reference will now be made to the accompanying drawings, which are not necessarily drawn to scale, and wherein:

FIG. 1 is a schematic diagram of a laser resonator according to example embodiments;

FIGS. 2*a* (top view), 2*b* (cross section) and 2*c* (exploded cross section) are schematic diagrams of a statically-actuated mirror according to one example embodiment;

FIGS. 3*a* (top view), 3*b* (cross section) and 3*c* (exploded cross section) are schematic diagrams of a modal corrector mirror according to one example embodiment;

FIGS. 4 and 5*a*, 5*b* and 5*c* are flowcharts illustrating various steps in methods according to example embodiments of the present disclosure;

DETAILED DESCRIPTION

Figure 1:
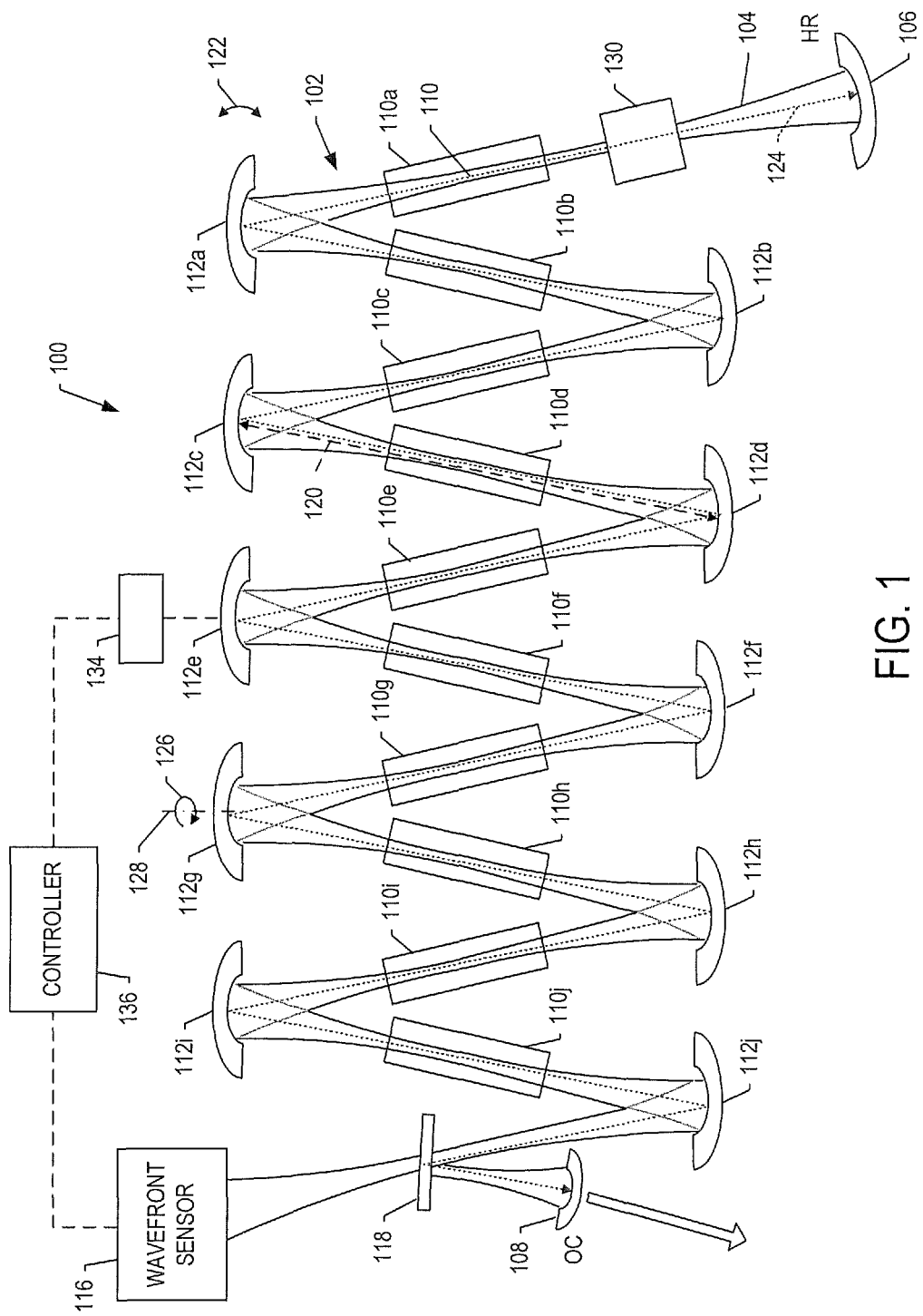

Some embodiments of the present disclosure will now be described more fully hereinafter with reference to the accompanying drawings, in which some, but not all embodiments of the disclosure are shown. Indeed, various embodiments of the disclosure may be embodied in many different forms and should not be construed as limited to the embodiments set forth herein; rather, these example embodiments are provided so that this disclosure will be thorough and complete, and will fully convey the scope of the disclosure to those skilled in the art. For example, unless otherwise indicated, reference something as being a first, second or the like should not be construed to imply a particular order. Like reference numerals refer to like elements throughout.

FIG. 1 illustrates a laser resonator 100 including a number of optical elements according to one example embodiment. As shown, the laser resonator 100 includes a cavity 102 in which a beam 104 may propagate. The cavity 102 may be bounded by a high-reflectance (HR) end mirror 106 and a partially-transmissive output coupler (OC) 108, and includes one or more gain media of any of a number of different geometries between the HR 106 and OC 108. In the example of FIG. 1, ten gain media are shown as gain media 110a, 110b, 110c, 110d, 110e, 110f, 110g, 110h, 110i, 110j (any one or more of which may be generally referred to as a gain medium 110), but it should be understood that the laser resonator 100 may include more or less than ten gain media 110. The laser resonator 100 also includes a plurality of fold mirrors, which may be used for folding the length or changing the effective Fresnel number of a longer system. In the example of FIG. 1, ten fold mirrors are shown as fold mirrors 112a, 112b, 112c, 112d, 112e, 112f, 112g, 112h, 112i, 112j (any one or more of which may be generally referred to as a fold mirror 112), but it should be understood that the laser resonator 100 may include more or less than ten fold mirrors 112.

The radii of curvature of the HR 106 and OC 108 and length of the cavity 102 between HR 106 and OC 108 may be designed for a suitable stability location of operation of the laser resonator 100, and the cavity length may be set by the number and placement of the fold mirrors 112. In one example, the laser resonator 100 may be visualized as being located somewhere in a stability diagram such as given in Chapters 19-21 of A. E. Siegman, LASERS (1986). In one example, the resonator 100 may be re-imaged and/or unstable due to it being otherwise more sensitive to small residual aberrations.

While specifics of the laser resonator 100 may depend on the stability diagram and chosen operating point on the diagram, it is generally useful to maintain the shape of the optical mode 114 throughout the gain volumes to improve energy extraction from the gain medium(s) 110. In order to control the equivalent Fresnel number of the laser resonator 100, some of the fold mirrors 112 may be re-imaging from optical element to optical element. This may shorten the effective cavity length of the laser resonator 100 while not actually causing a focus or image in the circulating mode itself, although such a true focus in the mode may occur as a consequence of a negative stability branch location of the system.

For a laser resonator with multiple optical elements such as multiple fold mirrors, intra-cavity aberrations may occur due to various causes. For example, one or more of the HR, OC, gain media or fold mirrors may have manufacturing errors, which may lead to aberrations in a laser resonator. Additionally or alternatively, for example, index shifts may be introduced in one or more of the gain media due to one or more of variations in the material index, or thermal effects and active gain. Further, for example, path index variation may be introduced in the laser resonator.

If not addressed, these intra-cavity aberrations may cause distortion in the mode shape from that intended. In particular, the mode may become contracted and exhibit apparent, undesired intensity maxima in one or both directions. These focal shifts, in turn, may lead to extreme power densities at optical elements within the laser resonator where the re-circulating flux is typically much higher than the useful output. Such "hot spots" may cause failure of the optics and/or leave substantial un-extracted power in the gain medium, which may also be destructive for high power systems. To avoid the destructive effects mentioned, one or more of the optical elements of the laser resonator 100, such as one or more of the fold mirrors 112, may be configured to correct errors that may be caused by the aforementioned aberrations. In one example, the laser resonator 100 may therefore be coupled to a wavefront sensor 116 and coupling mirror 118 to measure aberrations of the optical wavefront propagating in the laser resonator 100, which aberrations may be manifest in wavefront error. This wavefront sensor may be or include an interferometer such as common path interferometer or shearing interferometer, a Shack-Hartmann wavefront sensor or the like. As described herein, an error or aberration being described as being "corrected" may be corrected by reducing but not necessarily minimizing the respective error or aberration.

Figure 6:
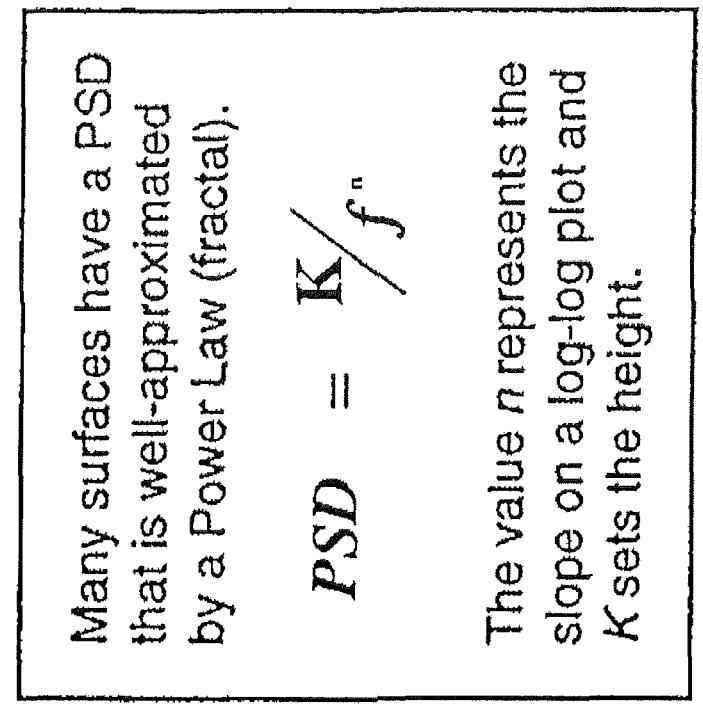
FIGS. 6 and 7 are plots of power spectral density versus spatial frequency, according to example embodiments.
Figure 6:
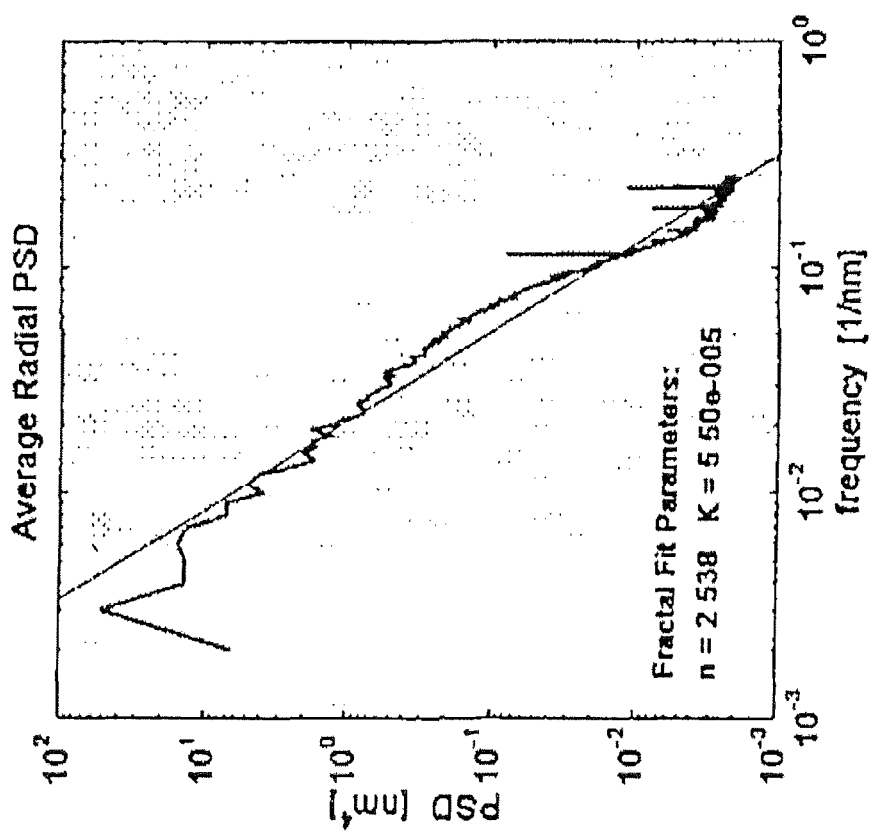
Figure 7:
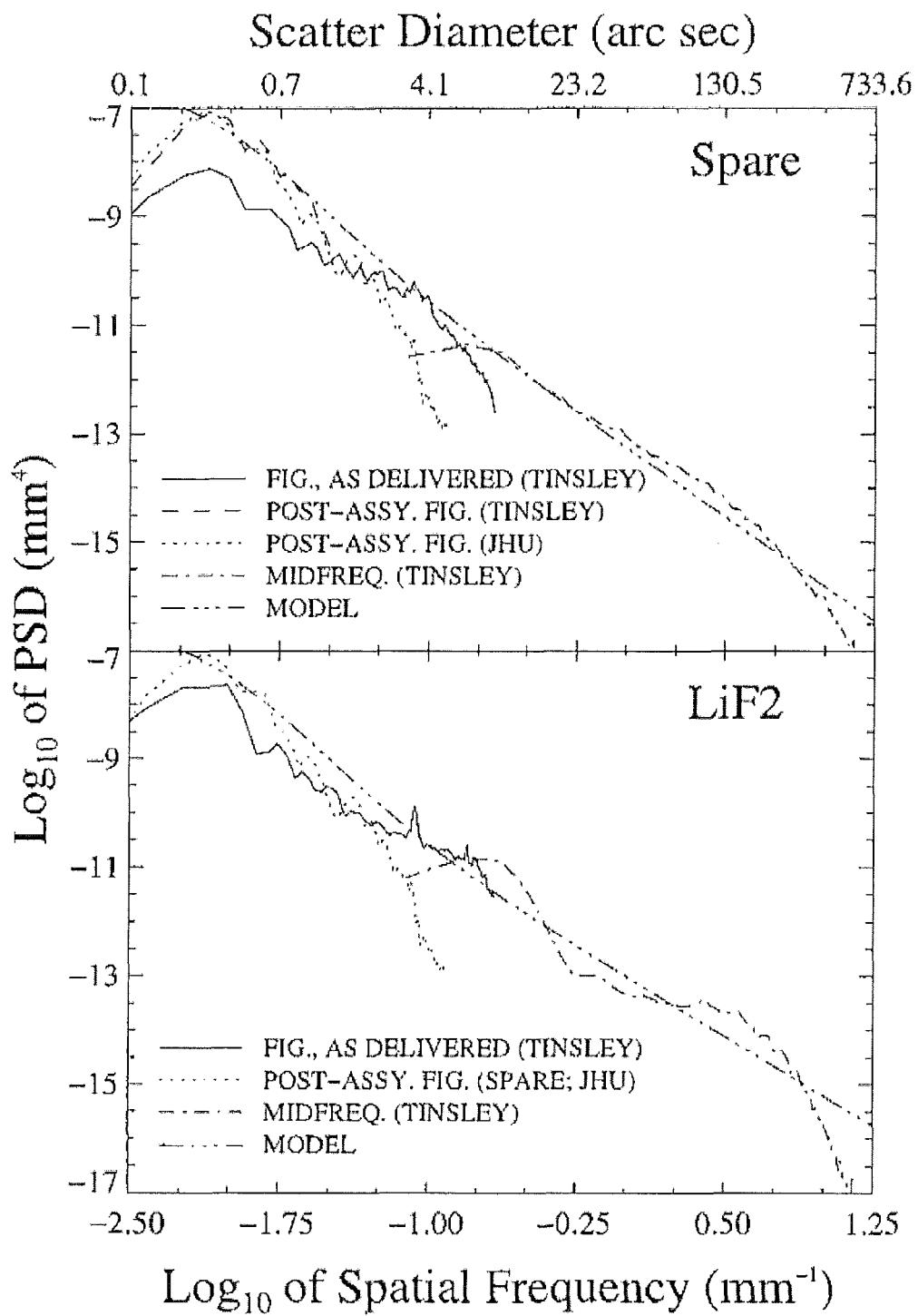

As indicated above and described more fully below, wavefront errors found in a laser resonator may include errors associated with material variations and thermal mapping, which are typically lower spatial frequency, together with active gain index shifts (also typically of lower frequency content) and manufacturing errors which tend to follow a log-log relationship (see FIGS. 6 and 7). In the steady state, these errors may be generally repeatable and relatively stable. The lowest spatial frequency aberrations such as focus and tilt may be corrected in a number of different manners. In one example, the lowest spatial frequency aberrations may be corrected by slightly increasing or decreasing the separation 120 between one or more fold mirror(s) 112 to correct for focus, and/or tilting 122 one or more of the fold mirror(s) 112 to correct for tilt. Adjusting the separation 120 between fold mirrors 112 may effectively correct focus because the resonator design point may be maintained by scaling the propagation length 124 to the nominal value for the fold mirror(s) 112. In an alternative example, focus may be corrected by the use of a static or active focus mirror (e.g., mirror 112e), sometimes referred to as a defocus mirror, which may either have a selectable radius of curvature or impart an axial shift. For more information on such a defocus mirror, see U.S. Pat. No. 7,649,691, the content of which is incorporated herein by reference in its entirety.

The next lowest spatial frequency aberrations such as astigmatism and trefoil may also be corrected in any of a number of different manners. For example, the next lowest spatial frequency aberrations may be corrected statistically through selectable rotation 126 of one or more fold mirrors 112, such as fold mirrors 112a, 112c, 112d, 112g, 112j, which may be correspondingly rotatable. In this regard, lower spatial frequency errors may be reduced by rotating 126 one or more of the fold mirrors 112 about its respective principal axis 128 so that random errors on those optical elements cancel or partially cancel errors in other optical elements of the laser resonator 100.

Consider for example, a fold mirror 112f that has 1/10 wave of astigmatism as the lowest residual above focus, and that the next fold mirror 112g has 9/100 wave of astigmatism as the lowest residual above focus. In this example, the next fold mirror 112g may be rotated 126 by 90 degrees about its principal axis 128 and with respect to fold mirror 112f to yield a pair of fold mirrors 112f, 112g that has a residual of only 1/100 wave. Similarly, for example, trefoil may be at least partially cancelled with a rotation 126 of 60 degrees and so on for various trigonometric orders if one considers a Zernike expansion of the errors. In one example, standard least squares techniques may be used in this way to simultaneously minimize the total residual for n terms using n+1 fold mirrors 112. When this has been accomplished, any remaining errors may be of higher order and small. As discussed in greater detail below, one may also statistically increase the probability of having fold mirrors 112 with approximately cancelling terms by a slight increase in the total number of elements procured. For a specific resonator 100, this selection may be used together with the other techniques described herein to establish an arbitrarily small probability of residuals above a desired level. If more than one resonator 100 is being populated, this selection process may be enhanced by providing a larger domain of fold mirrors 112 from which the selections may be made.

Figure 2A:
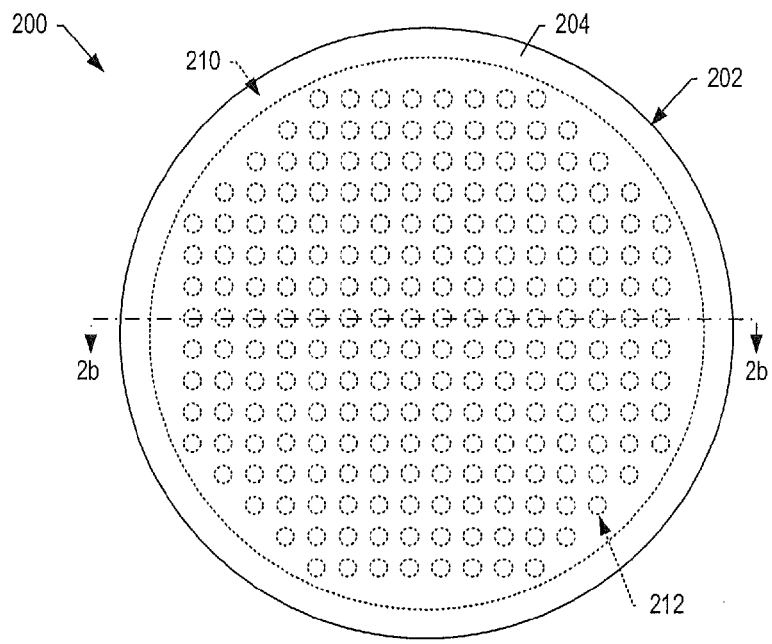
Figure 2B:
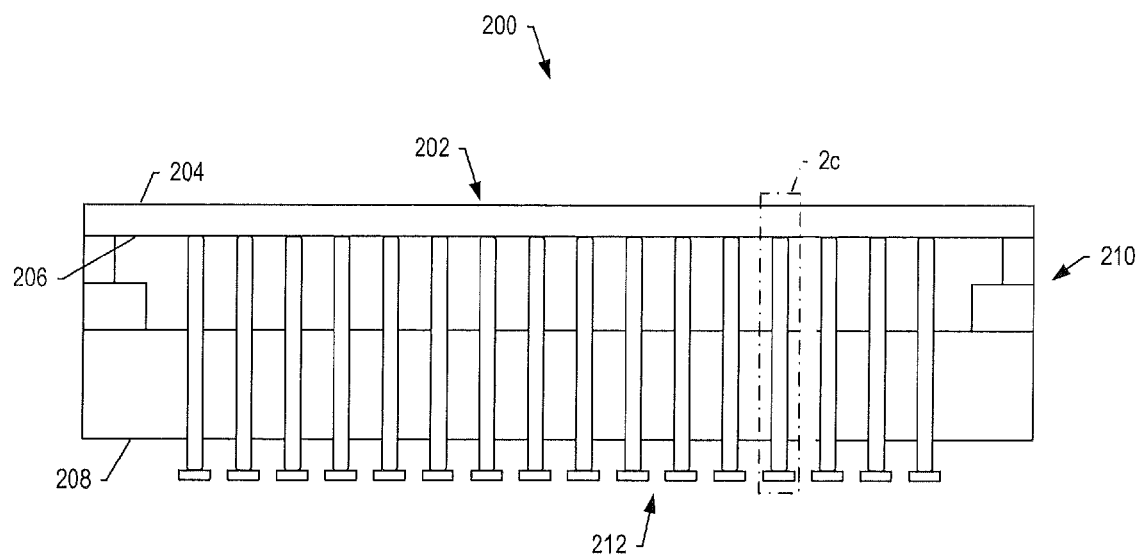
Figure 2C:
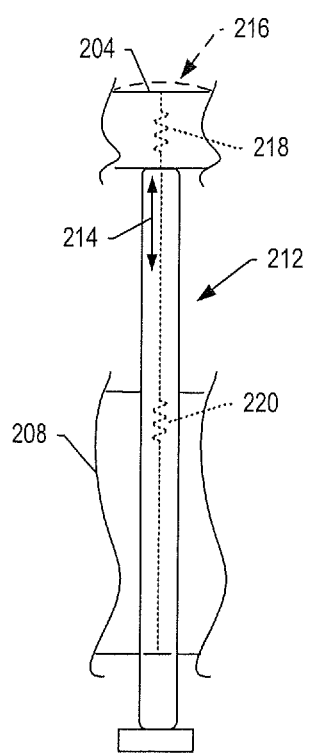

Any remaining or residual lower frequency aberrations may be corrected in a number of different manners. In one example, one or more of the fold mirrors 112, such as fold mirrors 112b, 112h, may be statically-actuated mirrors or "squeeze mirrors," which may be adjusted (e.g., at their edges) to cancel any remaining astigmatism and trefoils. In another example, the low frequency manufacture-dependent errors may be corrected by fabricating the needed figure directly on one or more fold mirrors (e.g., using magneto rheological finishing (MRF) fabrication or other similar figuring technique). In yet another example, the laser resonator 100 may include one or more rotator assemblies 130 in addition to or in lieu of one or more fold mirrors 112. These rotator assemblies 130 may be configured to rotate the beam 104 180, 90 or 120 degrees, which may allow for cancellation of the offending aberrations. In one example, these rotator assemblies 130 may be variants of M-mirror or K-mirror designs. FIGS. 2a, 2b and 2c (collectively "FIG. 2") illustrate an example statically-actuated mirror 200, which in one example embodiment, may correspond to one or more of the fold mirrors 112 (e.g., fold mirrors 112b, 112h) of FIG. 1. As shown, the statically-actuated mirror 200 may include a controllable-profile (deformable) faceplate 202, which in various examples may be constructed of a ceramic (e.g., glass), a semiconductor (e.g., silicon) or metal, and whose front surface 204 may be optically finished into a reflective surface. The back surface 206 of the faceplate 202 may be secured to a backplate 208 via a faceplate mount 210. The statically-actuated mirror 200 may include an array of static actuators 212 each of which extends through the backplate 208 and exerts a selectable, localized force to the back surface 206 of the faceplate 202 to collectively control the profile (shape) of the faceplate 202 and more particularly its front surface 204. As shown more particularly in FIG. 2c, each of the static actuators 212 may be an adjustable element, which may exert a selectable, localized push-pull force 214 on the faceplate 202, which may produce a local displacement 216 of the front surface 204 an amount in accordance with the stiffness 218 of the faceplate 202. In one example, the adjustable element may be a mechanically-adjustable element or actuator such as an actuating screw. In other examples, the adjustable element may be any of a number of other types of actuators, such as lead-magnesium-niobate (PMN) electrostrictive actuators, piezoelectric actuators (PZT), geared servomotors, electromagnetic actuators, hydraulic actuators or the like.

For a faceplate 202 with stiffness 218 of $k_{plate}$, for example, the statically-actuated mirror 200 may act on the faceplate with a force 214 of $k_{plate} \times \Delta x$ to displace 216 the faceplate $\Delta x$. In the context of a static actuator 212 in the form of a screw, $\Delta x$ may relate to the screw's pitch and number of turns of the screw such as in accordance with the following: $\Delta x = pitch \times turns$. For example, a static actuator 212 in the form of a 80-tpi (threads per inch) screw (pitch=1/80) turned 1/10 of a turn may directly produce a displacement 216 of 1/800 inch or 4.9 waves at 1.06 microns. The above example assumes that the adjustable element has a higher stiffness 220 than the faceplate 202 stiffness 218. Otherwise, in an instance in which the adjustable element has a stiffness 220 approximately equal the stiffness 218 of the faceplate 202, one may achieve a displacement 216 of approximately 2.4 waves, and so on.

Returning to FIG. 1, residual higher frequency aberrations may remain after the above corrections are applied. These residual higher spatial frequency aberrations may be small, but may cause "hot spots" in the resulting mode if not corrected. In accordance with example embodiments, one or more of the fold mirrors 112, such as fold mirror 112e, may be designed as a modal corrector mirror with compliant actuation. This modal corrector mirror may be adjusted to reduce the residual higher frequency aberrations. Because these residual higher frequency errors may be extremely small in terms of peak-to-valley shifts, the modal corrector mirror may employ actuator compliance significantly lower than that of the mirror's faceplate to inhibit adjustments from becoming so sensitive that manual control cannot be achieved.

Figure 3A:
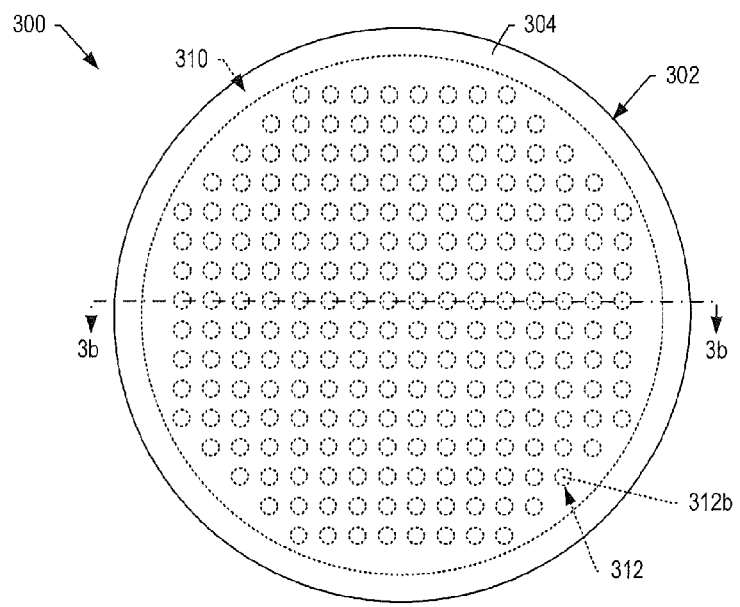
Figure 3B:
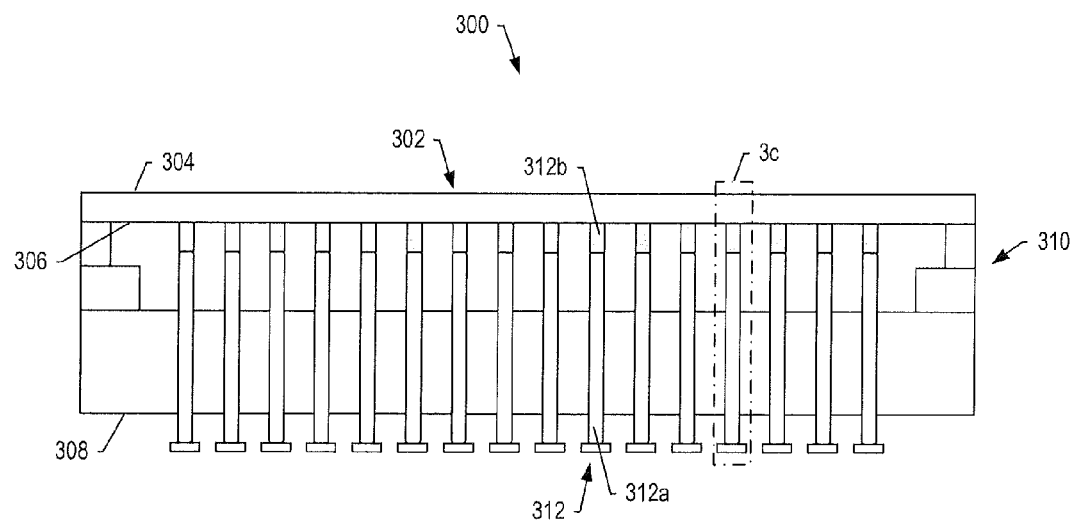
Figure 3C:
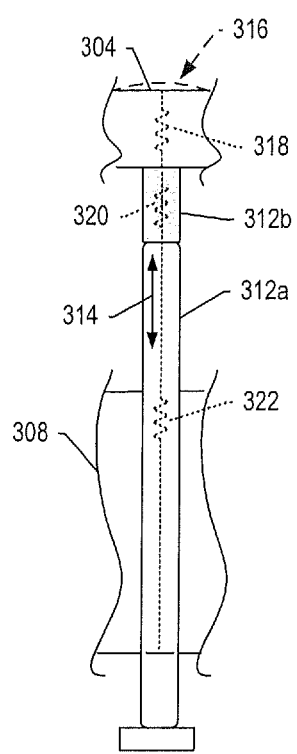

FIGS. 3a, 3b and 3c (collectively "FIG. 3") illustrate an example modal corrector mirror 300, which in one example embodiment, may correspond to one or more of the fold mirrors 112 (e.g., fold mirror 112e) of FIG. 1. Similar to the example statically-actuated mirror 200, the modal corrector mirror 300 may include a deformable faceplate 302, which in various examples may be constructed of glass, silicon or metal, and whose front surface 304 may be optically finished into a reflective surface. The back surface 306 of the faceplate 302 may be secured to a backplate 308 via a faceplate mount 310. Also similar to the example statically-actuated mirror 200, the modal corrector mirror 300 may include an array of static actuators 312 each of which extends through the backplate 308 and is configured to exert a selectable, localized force to the back surface 306 of the faceplate 302 to collectively control the higher order aberration (e.g., >3rd order) the profile of the faceplate 302 and more particularly its front surface 304. Each of the static actuators 312 includes an adjustable element 312a, which may be of any of a number of different types similar to that of the static actuators 212 of the example statically-actuated mirror 200. In contrast to the static actuators 212, however, each of the static actuators 312 further includes a compliant mechanism 312b between the adjustable element 312a and faceplate 302. As shown more particularly in FIG. 3c, the adjustable elements 312a may each be configured to exert a selectable, localized push-pull force 314 on the faceplate 302 via a respective compliant mechanism 312b, which may produce a local displacement 316 of the front surface 304 an amount in accordance with the stiffness 318 of the faceplate 202 and the stiffness 320 of the compliant mechanism 312b. Similar to before, the adjustable element 312 of various examples may have a stiffness 322 greater than or equal to the stiffness 318 of the faceplate 302. The compliant mechanisms 312b of the static actuators 312 may be biased flexible elements such as spring elements, and as such, they may apply a fractional-force multiplication of the force 314 exerted by respective adjustable elements 312a (i.e., "scale" the force exerted by the respective adjustable elements 312a), to thereby lessen the force 314 applied to the faceplate 302. This may in turn allow for application of smaller adjustments to the profile of the faceplate 302, without the need for screw or actuator pitches that may be impractical to manufacture. Again, in an example with a faceplate 302 having stiffness 318 of $k_{plate}$, the static actuator 312 may act on the faceplate 302 with the same force $k_{plate} \times \Delta x$ as before, but which results in a faceplate displacement of approximately $(k_{comp}/k_{plate}) \times \Delta x$. In the preceding, $k_{comp}$ represents the stiffness 320 of the compliant mechanism 312b, which may be selected in a number of different manners, and may be less than $k_{plate}$.

The stiffness 320 of the compliant mechanism 312b may be selected in any of a number of different manners, such as based on stiffness 318 of the faceplate 302. In one example of an adjustable element 312a in the form of a screw, if one desires one turn of the screw to be one wave, the stiffness 320 of the compliant mechanism 312b may be selected such that the product of it and the displacement of that turn is approximately equal to the force needed to cause one wave of displacement in the peak of the faceplate 302 influence function, which may depend on the stiffness of the faceplate 302. Consider again the above example in which static actuator 212 in the form of a 80-tpi screw turned 1/10 of a turn may directly produce a displacement 216 of 1/800 inch or 4.9 waves at 1.06 microns. In a comparative example, a static actuator 312 including an inline compliant mechanism 312b at 1:100 may allow 1 turn to produce approximately 1/2 wave of displacement 316. In the preceding, the ratio represents the ratio of the stiffness 320 of the compliant mechanism 312b to the stiffness 318 of the faceplate 302. Notably, the ratio may only be approximate since motion of the faceplate 302 may effectively decrease the total length, and a more exact calculation may take this into account.

Again returning to FIG. 1, in one example, one or more of the fold mirrors 112 may be manually, mechanically and individually tilted 122, rotated 126 or actuated (see FIGS. 2 and 3). In another example, the laser resonator 100 may include one or more drive units 134 coupled to one or more of the fold mirrors 112 (one drive unit 134 being shown coupled to fold mirror 112e), and which may be used to drive the tilting 122, rotation 126 or actuation of the respective mirrors 112. These drive units 134 may be directly controlled by an operator, or in another example, the laser resonator may further include one or more controllers 136 coupled to the drive units 134. In this example, the controller 136 may control the drive units 134 to drive the fold mirrors 112. The controller 136, in turn, may be directly controlled by an operator, or in an even further example, the controller 136 may be coupled to the wavefront sensor 116. In this example, the wavefront sensor 116 may provide aberration measurements to the controller 136, which may respond by controlling the drive units 134 to drive the tilting 122, rotation 126 or actuation of one or more fold mirrors 112. The wavefront sensor 116 may continue to provide aberration measurements during this process, and in this regard may function as a feedback mechanism.

Figure 4:
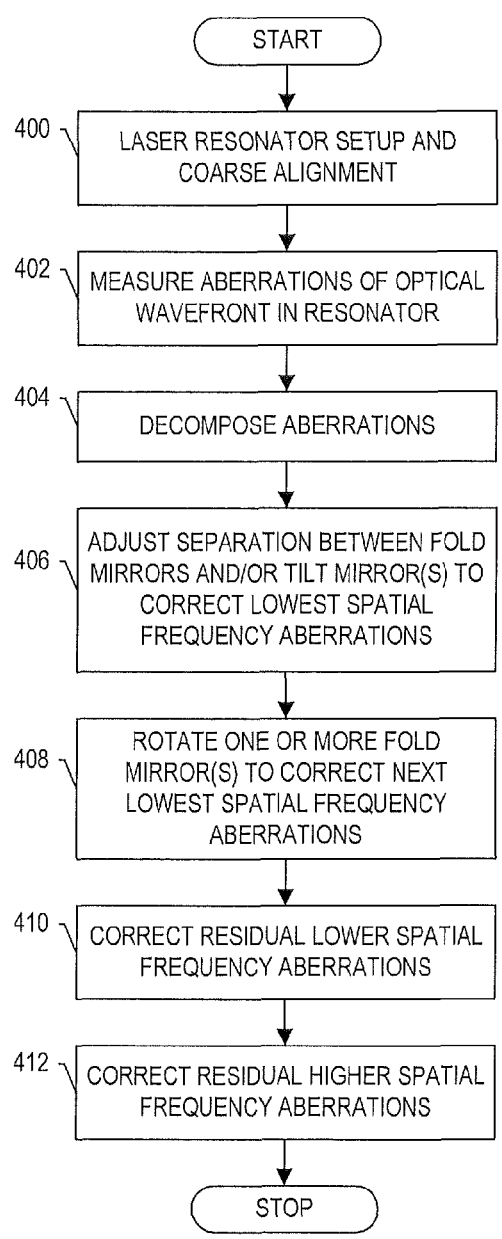

FIG. 4 illustrates various steps in a method of correcting aberrations according to example embodiments of the present disclosure. As shown at block 400, the method may include setup of the laser resonator 100 and coarse alignment of its optical elements, including one or more of its HR 106, OC 108, gain medium(s) 110 and/or fold mirrors 112. This setup and coarse alignment may include individual characterization (e.g., interferometrically) of one or more optical elements of the laser resonator 100. In one example, any element that is pumped such as the gain medium(s) 110 (and possibly some passive elements) may be characterized both with and without an operating flux so that both "cold" and "hot" profiles are available, although in one example, the "hot" are used for optimization. And reference mark may be added to any element that does not already possess a reference mark for orienting the respective element.

In various examples, coarse alignment of the laser resonator may be performed using optical theodolite measurements in combination with precision rulers or using laser distance measuring equipment (laser DME). This coarse alignment may be to assure the basic layout of the laser resonator 100 and that the angles of its optical elements including its fold mirrors 112 match an intended design. This coarse alignment may also include a preliminary analysis of the rotation cancellation of aberrations in the laser resonator 100 using the individual characterizations of its optical elements, and an initial "clocking" (angular) orientation for each optical element may be pre-determined for initial alignment of the laser resonator 100. Locations that may be used to correct residuals may be populated with optical elements having no correction.

After setup and coarse alignment of the laser resonator 100, aberrations of an optical wavefront propagating in the laser resonator 100 may be measured such as by performing a wavefront characterization of the laser resonator 100, as shown in block 402. In this regard, a wavefront sensing beam may be injected for propagation in the laser resonator 100, and the wavefront sensor 116 or an interferometer may measure aberrations in the wavefront of the wavefront sensing beam, from which a wavefront characterization of the laser resonator 100 may be determined. In one example, this characterization may be an initial characterization, and may be compared to an analytical prediction developed using the individual characterizations of the optical elements. Small corrections in clocking (rotation) and/or element geometry may be determined and applied, and another wavefront sensing beam injection and measurement may be made to determine a final wavefront characterization of the laser resonator 100.

Remaining aberrations in the laser resonator 100 may include one or more of the lowest spatial frequency aberrations such as focus and/or tilt, lower spatial frequency aberrations such as astigmatism and trefoil, residual lower and/or residual higher spatial frequency aberrations. As shown in block 404, these aberrations may be decomposed into an orthonormal set such as into balanced Zernike aberrations. The aberrations may possess the characteristic of being unaffected by changes in the aberrations below them in order because the lower orders have been removed from them. For example, while a change in coma may have an impact on the effective tilt of a beam 104, changes in Zernike trefoil may be balanced with respect to tilt and not displace the centroid of the beam 104. These aberrations may therefore be addressed from the lowest order up to the highest with the benefit in that small changes to correct a particular order may not necessitate realignment of the laser resonator 100 to readdress any lower order(s).

The method may include correcting the lowest spatial frequency aberrations such as focus and tilt, and/or the next lowest spatial frequency aberrations such as astigmatism. In one example, the lowest spatial frequency aberrations may be corrected by slightly adjusting (increasing or decreasing) the separation 120 between one or more fold mirror(s) 112 to correct for focus, and/or tilting 122 one or more of the fold mirror(s) 112 to correct for tilt, as shown in block 406. And as shown in block 408, for example, the next lowest spatial frequency aberrations may be corrected statistically through selectably rotating 126 of one or more fold mirrors 112 (e.g., fold mirrors 112a, 112c, 112d, 112g, 112j) about its respective principal axis 128 (sometimes referred to as a clocking shift). By this rotation, random errors on those optical elements may cancel or partially cancel errors in other optical elements of the laser resonator 100. In one example, the rotation of fold mirrors 112 may employ a standard least squares technique to minimize the total residual for n terms using n+1 fold mirrors 112. In one example, a defocus mirror such as that mentioned above may be employed to avoid significant changes in separation 120 (especially during startup).

Figure 5A:
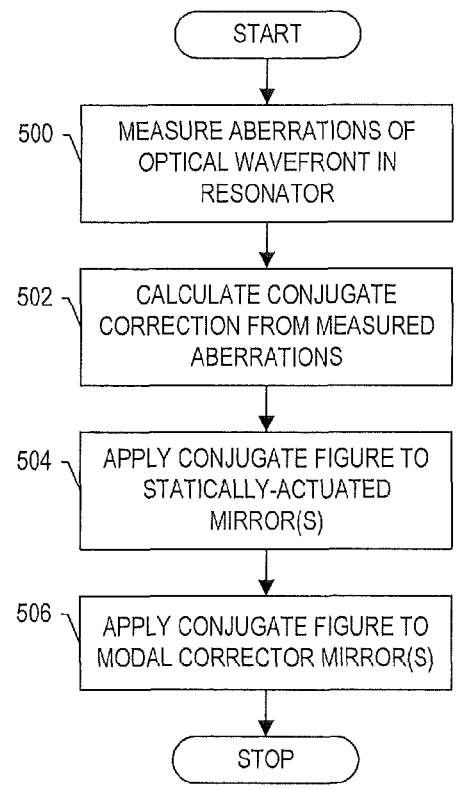
Figure 5B:
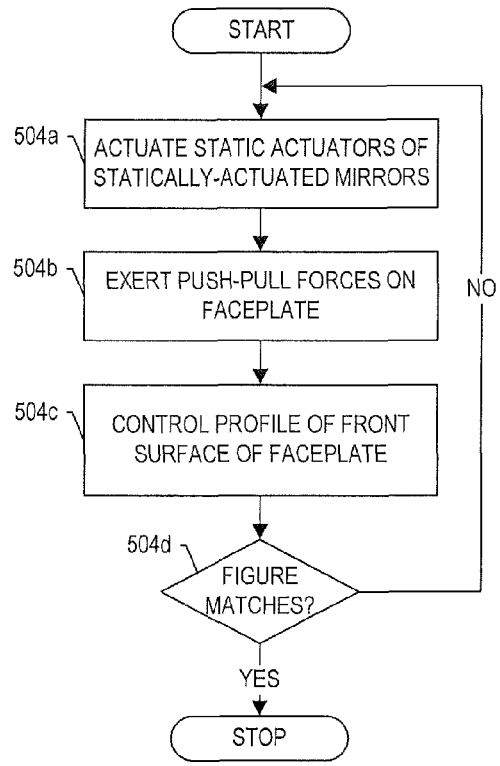
Figure 5C:
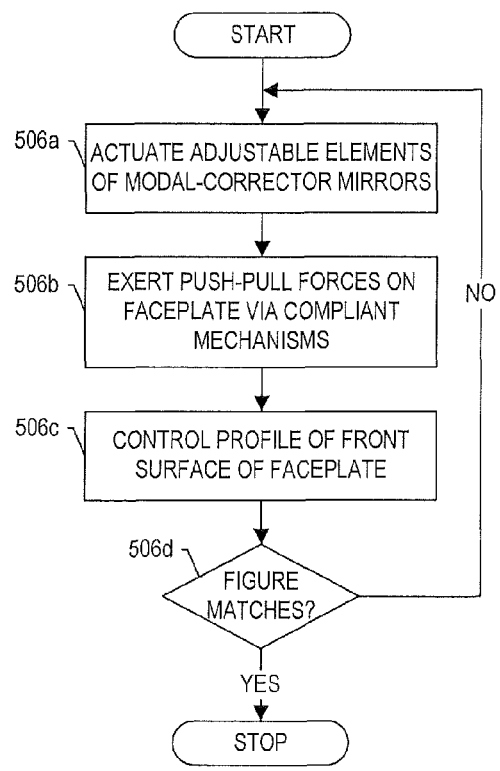

The method may further include correcting any remaining or residual lower frequency aberrations, and/or any remaining or residual higher frequency aberrations, as shown in blocks 410 and 412. FIGS. 5a, 5b and 5c (collectively "FIG. 5") illustrate various steps in a method of correcting residual lower and/or higher spatial frequency aberrations, according to example embodiments of the present disclosure. As shown at block 500, the method may include measuring aberrations of the optical wavefront propagating in the laser resonator 100, such as using the wavefront sensor 116 or an interferometer. In one example, the aberrations may be manifest in wavefront error, which may be sampled such as using a basis set with dimensionality exceeding that of a desired mode number to be corrected. From the measured aberrations (or wavefront error), the method may include calculating a conjugate correction figure for a single or multiple pass application, such as by developing a "reconstructor" from a pseudo-inverse or other generally applied wavefront reconstructor, as shown in block 502.

The conjugate correction figure may then be applied to the statically-actuated mirror(s) (e.g., fold mirrors 112b, 112h)) to correct residual lower spatial frequency aberrations, as shown in block 504. Similarly, the conjugate correction figure may be applied to the modal corrector mirror(s) (e.g., fold mirror 112e) to correct residual higher spatial frequency aberrations, as shown in block 506. In one example, applying the conjugate correction figure may include actuating (e.g., manually, mechanically and individually actuating) one or more of the static actuators 212 of the statically-actuated mirror(s) 200, thereby exerting push-pull forces on the faceplate 202 by the static actuators, and controlling the profile of its front surface 204 in accordance with the push-pull forces, as shown in blocks 504a, 504b and 504c of FIG. 5b. Similarly, in one example, applying the conjugate correction figure may include actuating (e.g., manually, mechanically and individually actuating) one or more of the adjustable elements 312a of the modal corrector mirror(s) 300, thereby exerting push-pull forces on the faceplate 302 by the adjustable elements via respective compliant mechanisms 312b, and controlling the profile of its front surface 304 in accordance with the push-pull forces, as shown in blocks 506a, 506b and 506c of FIG. 5c. For both the statically-actuated mirror(s) 200 and modal corrector mirror(s) 300, this may occur in one or more iterations until its figure matches or nearly matches the conjugate correction figure, as shown in blocks 504d and 506d, respectively, and which may be monitored by an interferometer or slope monitor.

In one example, low frequency manufacture-dependent errors may be corrected by fabricating the needed figure directly on one or more fold mirrors such as by using MRF fabrication or other similar figuring technique. That is, MRF or another similar process may be applied to one or more optical elements (e.g., fold mirror 112) to impose an inverse of any remaining errors and, hence, cancel the respective errors.

To further comprehend example embodiments of the present disclosure, and returning to FIG. 1, consider that when relatively low magnifications are needed to keep saturation high, the optical elements of the laser resonator 100 may become rather sensitive to figure error. In one example, wave optics simulations have shown that the total figure error should be kept below 0.07 waves RMS (root mean square) and should be targeted at 0.05 waves RMS or less to prevent unacceptable resonator performance. Taking a classical, purely random approach to tolerancing, in one example, this may require optical elements that average $\lambda/100$. Given that the HR 106, OC 108, gain media 110 and fold mirrors 112 may be in this sum (each being an optical element), enforcement of such a budget may drive costs to unacceptably high levels. The approach of example embodiments to control this performance term may therefore go beyond simple statistical sums. Optical elements may be procured with the lowest optical surface error that one may reasonably afford, but a bad actor in the elements may totally dominate the wavefront budget.

Polishing errors in optical elements may be categorized be grouped into three broad categories. Figure error may be generally taken for spatial frequencies from 1/(clear aperture) to 1/mm. Mid-spatial-frequency roughness may be taken for spatial frequencies from 1/mm to 20/mm which causes near-angle scatter. And high-spatial-frequency roughness may be taken for spatial frequencies from 20/mm to 500/mm, which may cause large angle scattering (generally light loss from imaging systems but may be problematic in resonators).

Standard "superpolishing" techniques have demonstrated figure errors of from 0.1 to 0.2 nanometers (RMS).

Errors for well-polished surfaces have been found to generally follow a "fractal fit," which may be considered a (mild) optical manufacturing analog of Tatarsky's famous atmospheric turbulence observations. In the turbulence case, Tatarsky was able to show that topological considerations and energy conservation were the only elements needed to derive the functional form of the turbulence spatial frequency behavior.

In the case of fabrication errors, a well-polished optical element may exhibit the largest departures from ideal at a spatial frequency corresponding to the inverse of the maximum dimension of the element. At smaller scales, this may mean that the contribution of a specific surface decreases.

For many well-polished surfaces, analyses such as determining fractal parameters may be performed, with the average radial 2D power spectral density (PSD) plotted on a 1D PSD plot, but with units of (length)$^4$. A best-fit line may be drawn for comparison with the average radial PSD, if the spatial frequency is plotted in 1D from 2D measurements that are approximately linear on a log-log plot (indicating a fractal surface finish). The equation for the straight line obtained from a log-log plot of the PSD versus spatial frequency f may be more commonly called a fractal fit, and may have parameters K and n that set its height and slope, respectively. Examples of this are shown in FIGS. 6 and 7, which are adapted from J. S. Taylor et al., *The Fabrication and Testing of Optics for EUV Lithography*, 23rd Annual Symposium on Microlithography, Santa Clara Calif. (Feb. 22-27, 1998); and Raymond G. Ohl et al., *Imaging Performance of Telescope Mirrors for Far-Ultraviolet Astronomy*, 39 (no. 25) APPLIED OPTICS 4513-4523 (Sep. 1, 2000), respectively. Generally, for higher slopes, the lower frequencies may have a greater relative importance. In one example, log spatial frequency varying from −2 to −3.5 may be of particular interest.

For such fractal fits, the RMS surface error may be given directly by integration:

$$\sigma^2 = \int_{f1}^{f2} \frac{2\pi Kf}{f^n} df = \left[\frac{2\pi Kf^{2-n}}{(2-n)}\right]_{f1}^{f2} \quad (1)$$

In at least one study, researchers concluded that the preferred metric for determining the impact of these long spatial wavelength phase errors is the RMS phase gradient. In this regard, the RMS gradient error from a fractal fit may be given as follows:

$$\mu^2 = \int_{f1}^{f2} \frac{2\pi Kf}{f^n} (2\pi f)^2 df = \left[\frac{8\pi^3 Kf^{4-n}}{(4-n)}\right]_{f1}^{f2} \quad (2)$$

The aforementioned researchers (parenthetically) observed that classical peak to valley specifications were adequate for smaller optics with older polishing techniques since the traditional polishing methods tended to band the RMS slope error in proportion to observed peak-to-valley in any case.

Polishing techniques have been developed that may result in extremely accurate optical elements, such as those that may achieve a mean figure error at better than approximately $\lambda/50$/cm RMS. The primary cost sensitivity for these optical elements may not relate to obtaining a well-polished surface, but instead may relate to the difficulty of actually measuring the respective elements to prove that they meet the desired specification.

A more cost-effective option (where available) may be to acquire more optical elements (e.g., fold mirrors 112) than needed at or near a price-driver threshold, and "cherry pick" from the larger statistical sample thereby achieved. By combining this approach with rotation of fold mirrors 112 (e.g., fold mirrors 112a, 112c, 112d, 112g, 112j), a lower total error may be achieved with a less-severe and less costly specification. This approach may allow for using aberration matching with fold mirror rotation to reduce lower order aberrations in part, rather than just accepting a statistically independent sum. The higher frequency spatial content may, then, be corrected using modal corrector mirror(s) (e.g., fold mirror 112e) of example embodiments.

Lower-order aberrations that impact performance such as coma and astigmatism may be where the spatial frequency is approximately 2/(optic size). Beyond this, higher radial modes (in Zernike representations of the error) may contribute lower peak errors (as governed by the fractal fit behavior). In the Fractal plot from FIG. 7, "(2−n)" may be roughly an inverse of the spatial frequency (actually 1/(1.333f). Scaling the contributions of random Zernike errors by 1/(1.3×radial order) may therefore give a reasonable worst-case correspondence between probable and modeled behavior.

If a distribution is assumed to exhibit a totally random behavior between zero and some fractal-scaled value, then one may examine the behavior of rotating fold mirror(s) 112 (e.g., fold mirrors 112a, 112c, 112d, 112g, 112j) and alternate element section on the ability to decrease total wavefront error in the resonator 100. If the scaling factor for such a process is q, then one may observe q×rand( ) as a value in the distribution of that specific error. In the preceding, a specific incidence of rand( ) may be referred to as $r_i$. When mirror rotation is used to cancel part of the residuals, one may co-align two residuals with opposite signs and inverse-align two residuals with the same sign (thereby subtracting the specific errors). Notably, this may only be done with a single aberration since in general, the rotation is random. If this is done, however, the primary residual may be reduced and the remaining residuals may be associated with a higher spatial frequency.

$$pr=|r_n-r_{n+k}| \quad (3)$$

One may also examine the $_nC_2$ combinations of n elements to choose a better net result in this process. For the case of three choices for example:

$$pr=\min(|r_1-r_2|, |r_1-r_3|, |r_2-r_3|) \quad (4)$$

Continuing this process, one may find the following gains for n choices:

| n | 2 | 3 | 4 |
|---|---|---|---|
| σ | 0.331701 | 0.10726321 | 0.0736933 |

Since RMS higher spatial frequency errors may be much smaller than RMS lower spatial frequency errors, using the above relationships and statistical techniques, it may be shown that the lower frequency errors may be at least partially cancelled by using the freedom of rotation about the axis of the elements, whereas the smaller high frequency errors usually cannot. The remaining errors may then be small amplitude errors usually in the high frequency spatial regime, which may be corrected using the modal corrector mirror(s) (e.g., fold mirror 112e) of example embodiments. If the resonator equivalent Fresnel number is low enough, these errors may only be corrected on a round trip basis.

Low frequency corrections on a round trip basis may be corrected on an element completely separate from that used to correct higher spatial frequency errors. In one example, then, the modal corrector mirror(s) (e.g., fold mirror 112e) of example embodiments may not employ or include means for correcting lower spatial frequency errors. For example, the modal corrector mirror 300 may include only adjustable element 312a with inline compliant mechanisms 312b, and may otherwise be devoid of other active actuators that may otherwise be capable of correcting higher spatial frequency errors. Examples of these actuators include active or automated actuators such as automated screws, pneumatic actuators, electro-mechanical actuators, piezoelectric actuators or the like. Similarly, for example, the modal corrector mirror (e.g., fold mirror 112e) may not employ mirror rotation similar to that employed by other fold mirror(s) 112 (e.g., fold mirrors 112a, 112c, 112d, 112g, 112j). If the corrections were combined, shifts at the lower spatial frequencies may also shift the high frequencies. Since the errors may be measured directly by using a wavefront sensor or interferometer in a resonator application, this added shift may complicate correction of the desired mode.

Figure 8:
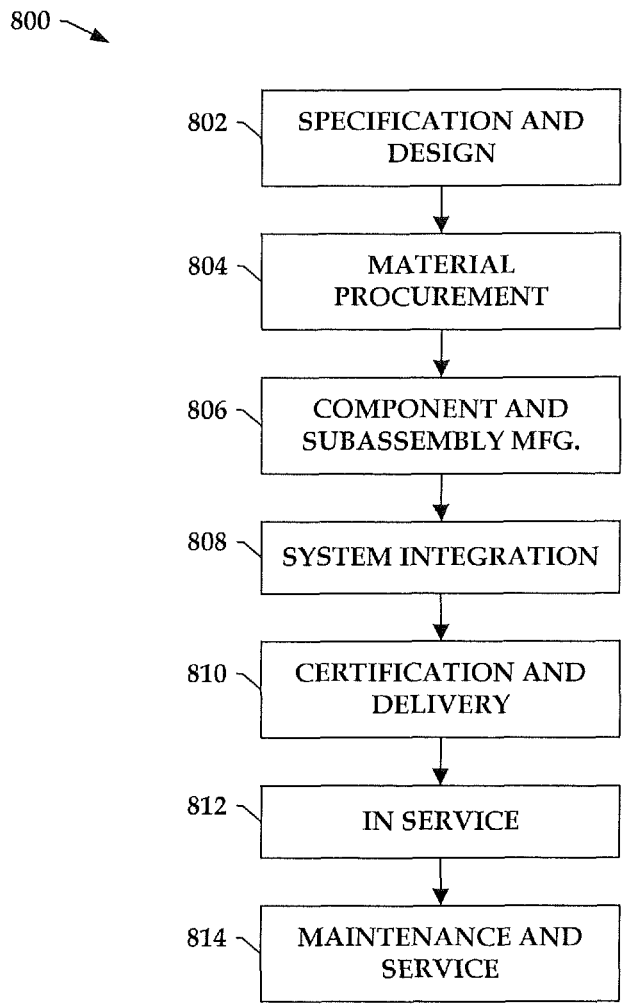
FIG. 8 is a flow diagram of an example aircraft production and service methodology.
Figure 9:
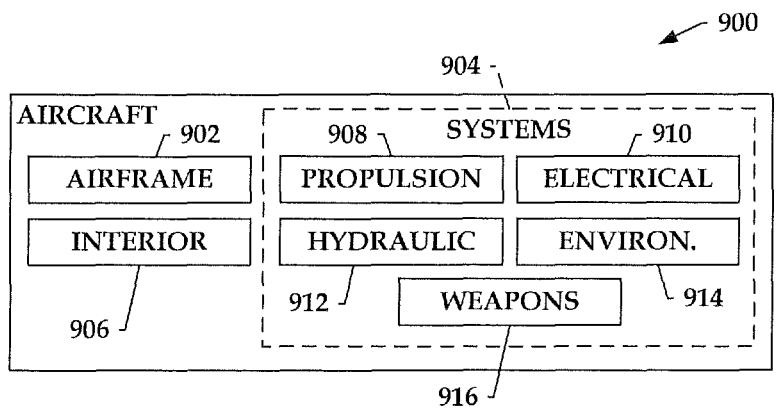
FIG. 9 is a block diagram of an example aircraft.

Embodiments of the disclosure may find use in a variety of potential applications, particularly in the transportation industry, including for example, aerospace, marine and automotive applications. Thus, referring now to FIGS. 8 and 9, example embodiments may be used in the context of an aircraft manufacturing and service method 800 as shown in FIG. 8, and an aircraft 900 as shown in FIG. 9. During pre-production, example method 800 may include specification and design 802 of the aircraft 900 and material procurement 804. During production, component and subassembly manufacturing 806 and system integration 808 of the aircraft 900 takes place. In one example, the disclosed apparatus and method may have application in one or more welding operations during either or both of the component and subassembly manufacturing process 806 or system integration 808. Thereafter, the aircraft 900 may go through certification and delivery 810 in order to be placed in service 812. While in service by a customer, the aircraft 900 is scheduled for routine maintenance and service 814 (which may also include modification, reconfiguration, refurbishment, and so on). In one example, the disclosed apparatus and method may also have application in one or more welding operations while in service 812, and in one example, during the maintenance and service 814.

Each of the processes of method 800 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 9, the aircraft 900 produced by example method 800 may include an airframe 902 with a plurality of systems 904 and an interior 906. Examples of high-level systems 904 may include one or more of a propulsion system 908, an electrical system 910, a hydraulic system 912, an environmental system 914 or a weapons system 916. In one example, the disclosed apparatus and method may be utilized in any of a number of different weapons systems 916. Examples of suitable weapons systems include directed energy weapon systems such as ATL (advanced tactical laser), ABL (airborne laser) or the like. Any number of other systems may be included. Although an aerospace example is shown, the principles of the disclosure may be applied to other industries, such as the automotive industry.

As suggested above, the apparatus and methods embodied herein may be employed during any one or more of the stages of the production and service method 800. For example, components or subassemblies corresponding to production process 806 may be fabricated or manufactured in a manner similar to components or subassemblies produced while the aircraft 900 is in service. Also, one or more apparatus embodiments, method embodiments or a combination thereof may be utilized during the production stages 806 and 808, for example, by substantially expediting assembly of or reducing the cost of an aircraft 900. Similarly, one or more of apparatus embodiments, method embodiments or a combination thereof may be utilized while the aircraft 900 is in service, for example and without limitation, to maintenance and service 814.

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A laser resonator comprising:
   a cavity bounded by an end mirror and output coupler;
   one or more gain media between the end mirror and output coupler;
   one or more fold mirrors between the end mirror and output coupler, each of the one or more fold mirrors being rotatable around its principal axis to correct lower spatial frequency error within the cavity; and
   a modal corrector mirror between the end mirror and output coupler, and separate from the one or more fold mirrors, the modal corrector mirror comprising:
      a controllable-profile faceplate including an optically-treated front surface; and
      an array of static actuators comprising a plurality of adjustable elements with a respective plurality of compliant mechanisms located between the plurality of adjustable elements and faceplate, each static actuator of the array of static actuators comprising:
         an adjustable element of the plurality of adjustable elements; and
         a compliant mechanism of the respective plurality of compliant mechanisms, the compliant mechanism being located between the adjustable element and faceplate,
         the adjustable element being configured to exert a selectable, localized push-pull force on the faceplate via the compliant mechanism, and the compliant mechanism being configured to scale the respective force, to correct residual higher spatial frequency error within the cavity, and
   the modal corrector mirror including only the plurality of adjustable elements with the respective plurality of complaint mechanisms located between the plurality of adjustable elements and faceplate.

2. The laser resonator of claim 1 further comprising:
   one or more statically-actuated mirrors between the end mirror and output coupler, the one or more statically-actuated mirrors being separate from the modal corrector mirror and configured to correct lower frequency error within the cavity, the modal corrector mirror being configured to correct residual higher spatial frequency error within the cavity.

3. The laser resonator of claim 1, wherein the adjustable element comprises an actuating screw.

4. The laser resonator of claim 1, wherein the compliant mechanism has a stiffness less than that of the faceplate.

5. The laser resonator of claim 1, wherein the compliant mechanism has a stiffness selected based on a stiffness of the faceplate.

6. A method comprising:
   measuring aberrations of an optical wavefront propagating in a laser resonator including a cavity and one or more fold mirrors within the cavity;
   rotating each of the one or more fold mirrors around its principal axis to correct lower spatial frequency error within the cavity;
   calculating a conjugate correction figure from the measured aberrations; and
   applying the conjugate correction figure to a modal corrector mirror within the cavity of the laser resonator to correct residual higher spatial frequency error within the cavity, the modal corrector mirror being separate from the one or more fold mirrors and comprising:
      a controllable-profile faceplate including an optically-treated front surface; and an array of static actuators comprising a plurality of adjustable elements with a respective plurality of compliant mechanisms located between the plurality of adjustable elements and faceplate, each static actuator of the array of static actuators comprising:
an adjustable element of the plurality of adjustable elements; and
a compliant mechanism of the respective plurality of compliant mechanisms, the compliant mechanism being located between the adjustable element and faceplate,
the adjustable element being configured to exert a selectable, localized push-pull force on the faceplate via the compliant mechanism, and the compliant mechanism being configured to scale the respective force, and
the modal corrector mirror including only the plurality of adjustable elements with the respective plurality of compliant mechanisms located between the plurality of adjustable elements and faceplate,
wherein applying the conjugate correction figure comprises:
actuating one or more adjustable elements of the array of static actuators;
exerting push-pull forces on the faceplate by the adjustable elements via respective compliant mechanisms between the adjustable elements and faceplate; and
controlling the profile of the front surface of the faceplate in accordance with the push-pull forces.

7. The method of claim 6, wherein the actuating one or more adjustable elements, exerting push-pull forces and controlling the profile of the front surface occur until a figure of the front surface matches or nearly matches the conjugate correction figure.

8. The method of claim 6, wherein the laser resonator further includes one or more statically-actuated mirrors within the cavity, the one or more statically-actuated mirrors being separate from the modal corrector mirror, and wherein the method further comprises:
applying a second conjugate correction factor to the one or more statically-actuated mirrors to correct residual lower frequency error within the cavity, the conjugate correction figure being applied to the modal corrector mirror to correct residual higher spatial frequency error within the cavity.

\* \* \* \* \*